United States Patent
Kim et al.

(10) Patent No.: US 9,626,505 B2
(45) Date of Patent: Apr. 18, 2017

(54) METHOD AND APPARATUS FOR MANAGING AUTHENTICATION

(71) Applicant: Samsung Electronics Co., Ltd., Gyeonggi-do (KR)

(72) Inventors: Mooyoung Kim, Seoul (KR); Moonsoo Kim, Seoul (KR); Yohan Lee, Gyeonggi-do (KR); Jungeun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/683,833

(22) Filed: Apr. 10, 2015

(65) Prior Publication Data

US 2015/0294108 A1    Oct. 15, 2015

(30) Foreign Application Priority Data

Apr. 10, 2014    (KR) .......................... 10-2014-0043168

(51) Int. Cl.
| | | |
|---|---|---|
| *G06F 7/04* | (2006.01) | |
| *G06F 21/45* | (2013.01) | |
| *G06F 21/32* | (2013.01) | |
| *G06F 21/36* | (2013.01) | |

(52) U.S. Cl.
CPC .............. *G06F 21/45* (2013.01); *G06F 21/32* (2013.01); *G06F 21/36* (2013.01); *G06F 2221/2137* (2013.01)

(58) Field of Classification Search
CPC ........... G06F 21/32; G06F 21/36; G06F 21/45
USPC ........................................................ 726/18
See application file for complete search history.

(56) References Cited

U.S. PATENT DOCUMENTS

| | | | | |
|---|---|---|---|---|
| 8,621,578 | B1* | 12/2013 | Blomquist | .............. G06F 21/36 |
| | | | | 713/182 |
| 9,038,167 | B2* | 5/2015 | Fadell | .................... G06F 21/316 |
| | | | | 713/182 |
| 9,253,633 | B2* | 2/2016 | Larmo | .................... H04W 12/04 |
| 2005/0041841 | A1* | 2/2005 | Yoo | ........................ G06F 1/1616 |
| | | | | 382/124 |
| 2006/0075250 | A1* | 4/2006 | Liao | .................. H04M 1/72519 |
| | | | | 713/182 |
| 2006/0224645 | A1* | 10/2006 | Kadi | ...................... G06F 3/0238 |
| | | | | 708/200 |
| 2009/0083850 | A1* | 3/2009 | Fadell | .................... G06F 21/316 |
| | | | | 726/19 |

(Continued)

FOREIGN PATENT DOCUMENTS

| | | |
|---|---|---|
| JP | 2012-103792 | 5/2012 |
| KR | 10-2010-0074218 | 7/2010 |

*Primary Examiner* — Samson Lemma
(74) *Attorney, Agent, or Firm* — The Farrell Law Firm, P.C.

(57) ABSTRACT

A method of and an apparatus for managing authentication in an electronic apparatus are provided. The method includes obtaining authentication information using an authentication module; pairing the authentication information with an object to which access is controlled; and displaying an image related to the object together with the authentication information. The electronic apparatus includes an authentication module configured to obtain authentication information; a control module configured to pair the authentication information with an object to which access is controlled; and a display module configured to display an image related to the object together with the authentication information.

23 Claims, 13 Drawing Sheets

(56) References Cited

U.S. PATENT DOCUMENTS

| | | | |
|---|---|---|---|
| 2009/0190189 A1* | 7/2009 | Suga | H04N 1/00127 358/474 |
| 2014/0090035 A1* | 3/2014 | Kodama | G06F 21/31 726/6 |
| 2014/0258110 A1* | 9/2014 | Davis | G06Q 20/227 705/41 |

* cited by examiner

[410]

[420]

[430]

[440]

[610]

[620]

[730]　　　　　　　　　　　　[740]

[840]

[850]

METHOD AND APPARATUS FOR MANAGING AUTHENTICATION

PRIORITY

This application claims priority under 35 U.S.C. §119(a) to a Korean Patent Application filed on Apr. 10, 2014 in the Korean Intellectual Property Office and assigned Serial No. 10-2014-0043168, the entire contents of which are incorporated herein by reference.

BACKGROUND

1. Field of the Invention

The present invention relates generally to a method for effectively managing authentication information, and more particularly, to a method for effectively managing authentication by obtaining authentication information via an authentication module, pairing the authentication information with an object to which access is controlled, and displaying an image related to the object with the authentication information.

2. Description of the Related Art

Due to the development of communication technologies and the electronic industry, portable terminals have become an indispensable part of peoples' lives. Such portable terminals are used for photographing, navigating, or making payments. Therefore, a user can use various functions of a portable terminal, such as taking photos without a separate camera, finding directions without a separate navigation device, or making payments without money or credit cards.

However, a portable terminal may store a significant amount of privileged information, so, to protect the information, the portable terminal authenticates the user via authentication modules, and then executes functions that match the authentication modules. For example, in the case of fingerprint authentication, a portable terminal may automatically input information for logging onto the Internet upon the completion of the fingerprint authentication. Various solutions are provided in order to use an authentication function of the portable terminal along with iris recognition, or biometric data such as fingerprint authentication. So, the user requires a means for effectively managing various utilized authentication methods.

According to the related art, in the case of executing a plurality of functions or applications of the portable terminal via authentication modules, it is difficult to identify which authentication module is currently active. In addition, a means for recognizing a valid period of an authentication module is not provided, and in the case of one-time authentication, the user should authenticate himself or herself whenever he or she uses the portable terminal. Furthermore, diversification of authentication modules requires technologies for various utilization methods, for example, designation of an authentication module using the authentication modules.

SUMMARY

The present invention has been made to address the above-mentioned problems and disadvantages, and to provide at least the advantages described below. Accordingly, an aspect of the present invention provides a method of and apparatus for managing authentication in an electronic apparatus.

In accordance with an aspect of the present invention a method of managing authentication in an electronic apparatus is provided. The method includes obtaining authentication information via an authentication module; pairing the authentication information with an object to which access is controlled; and displaying an image related to the object together with the authentication information.

In accordance with another aspect of the present invention an electronic apparatus is provided. The electronic apparatus includes an authentication module configured to obtain authentication information; a control module configured to pair the authentication information with an object to which access is controlled; and a display module configured to display an image related to the object together with the authentication information.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
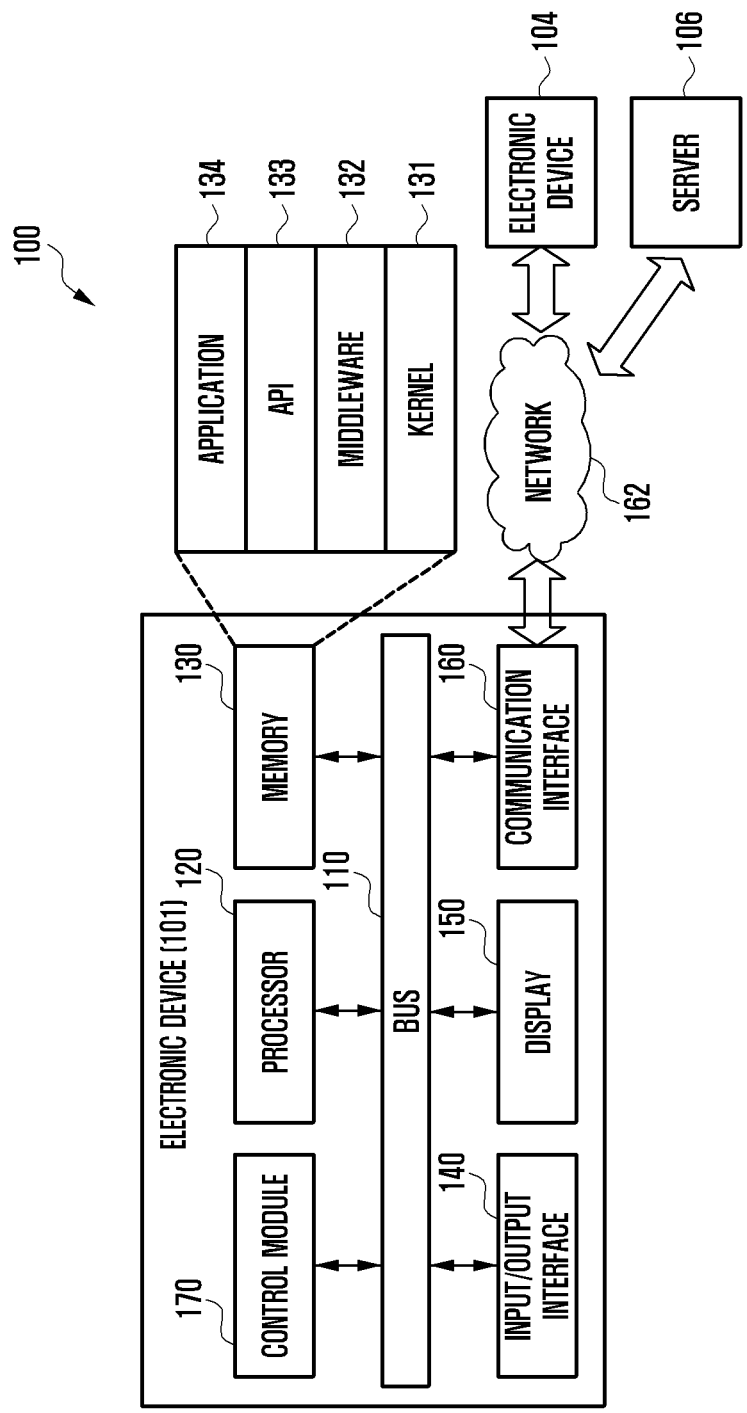
FIG. 1 is a block diagram of a network environment including an electronic apparatus according to an embodiment of the present invention.

Hereinafter, the present invention is described with reference to the accompanying drawings. The present invention may have various embodiments, and modifications and changes may be made therein. Therefore, the present invention will be described in detail with reference to embodiments shown in the accompanying drawings. However, it should be understood that there is no intent to limit the present invention to the particular forms, and the present invention should be construed to cover all modifications, equivalents, and/or alternatives falling within the scope and spirit of the present invention. In describing the drawings, similar elements are designated by similar reference numerals.

As used in the present invention, the expression "include" or "may include" refers to the existence of a corresponding function, operation, or constituent element, and does not limit one or more additional functions, operations, or constituent elements. Further, as used in the present invention, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present invention, the expression "or" includes any or all combinations of words enumerated together. For example, the expression "A or B" may include A, B, or both A and B.

While expressions including ordinal numbers, such as "first" and "second," as used in the present invention may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be referred to as a second constituent element, and likewise a second constituent element may also be referred to as a first constituent element without departing from the scope of the present invention.

When a component is referred to as being "connected" to or "accessed" by another component, it should be understood that the component may be directly connected to or accessed by the other component, but another component may also be interposed between them. In contrast, when a component is referred to as being "directly connected" to or "directly accessed" by another component, it should be understood that there is no additional component between the component and the other component.

The terms as used in an embodiment of the present invention are merely for the purpose of describing the embodiment and are not intended to limit the present invention. Singular forms are intended to include plural forms unless the context clearly indicates otherwise.

Unless defined otherwise, all terms used herein, including technical terms and scientific terms, have the same meanings as commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present invention.

An electronic device according to the present invention may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smartwatch).

According to an embodiment of the present invention, an electronic device may be a smart home appliance with a communication function. The smart home appliance as the electronic device, for example, may include at least one of a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to an embodiment of the present invention, electronic devices may include at least one of various medical devices (e.g., Magnetic Resonance Angiography (MRA). Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point of Sale (POS) device in a shop or store.

According to an embodiment of the present invention, an electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device according to the present invention may be a combination of one or more of the aforementioned various devices. Further, an electronic device according to the present invention may be a flexible device. Further, it will be apparent to those skilled in the art that an electronic device according to the present invention is not limited to the aforementioned devices.

Hereinafter, an electronic device according to an embodiment of the present invention will be discussed with reference to the accompanying drawings. The term "a user" as used in an embodiment of the present invention may refer to any person who uses an electronic device or any other device (e.g., an artificial intelligence electronic device) using an electronic device.

FIG. 1 is a block diagram of a network environment 100 including an electronic device 101 according to an embodiment of the present invention.

Referring to FIG. 1, the electronic device 101 includes a bus 110, a processor 120, a memory 130, an input/output interface 140, a display 150, a communication interface 160, and a control module 170.

The bus 110 is a circuit interconnecting the aforementioned components and transmitting communication (e.g., a control message) between the aforementioned components.

The processor 120, for example, receives instructions from the aforementioned components (e.g., the memory 130, the input/output interface 140, the display 150, the communication interface 160, and the control module 170) other than the processor 120 via the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the control module 170). The memory 130 includes programming modules, for example, a kernel 131, middleware 132, an Application Programming Interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the remaining other programming modules, for example, the middleware 132, the API 133, and the applications 134. Further, the kernel 131 provides an interface that allows the middleware 132, the API 133, or the applications 134 to access and control or manage individual components of the electronic device 101.

The middleware 132 serves to mediate between the API 133 or the applications 134 and the kernel 131, that is, allow the API 133 or the application 134 to communicate and exchange data with the kernel 131. Further, the middleware 132 performs control (e.g., scheduling or load balancing) for task requests received from the applications 134 by using, for example, a method of assigning a priority for use of a system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to an embodiment of the present invention, the applications 134 may include a Short Message Service/Multimedia Messaging Service (SMS/MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device 104. Additionally or alternatively, the notification relay application, for example, may receive notification information from an external electronic device 104 and provide the received notification information to a user. The device management application, for example, may manage (e.g., install, remove, or update) a function for at least a part of an external electronic device 104 communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to an embodiment of the present invention, the applications 134 may include an application specified according to an attribute (e.g., type) of an external electronic device 104. For example, when the external electronic device is an MP3 player, the applications 134 include an application associated with music playback. Similarly, when the external electronic device is a mobile medical device, the applications 134 include an application associated with health care. According to an embodiment of the present invention, the applications 134 may include at least one of an application assigned to the electronic device 101 and an application received from an external electronic device (e.g., the server 106 or the electronic device 104).

The input/output interface 140, for example, transfers instructions or data, input from a user via an input/output device (e.g., a sensor, a keyboard, or a touch screen), to the processor 120, the memory 130, the communication interface 160, or the control module 170 via the bus 110. For example, the input/output interface 140 provides the processor 120 with data corresponding to a user's touch input via a touch screen. Further, the input/output interface 140 may, for example, receive instructions or data from the processor 120, the memory 130, the communication interface 160, or the control module 170 via the bus 110 and output the received instructions or data via the input/output device (e.g., a speaker or a display). For example, the input/output interface 140 may output voice data processed by the processor 120 to a user via a speaker.

The display 150 displays various pieces of information (e.g., multimedia data or text data) to a user.

The communication interface 160 establishes communication between the electronic device 101 and an external electronic device (e.g., the electronic device 104 or the server 106). For example, the communication interface 160 may be connected to the network 162 via wireless or wired communication and thereby communicates with an external device. The wireless communication, for example, may include at least one of Wireless Fidelity (WiFi), Bluetooth (BT), Near Field Communication (NFC), a Global Positioning System (GPS), and cellular communication (e.g., Long Term Evolution (LTE), LTE Advanced (LTE-A), Code Division Multiple Access (CDMA), Wideband CDMA (WCDMA), Universal Mobile Telephone System (UMTS), Wireless Broadband (WiBro), or Global System for Mobile communication (GSM)). The wired communication, for example, may include at least one of a Universal Serial Bus (USB), a High Definition Multimedia Interface (HDMI), Recommended Standard 232 (RS-232), and a Plain Old Telephone Service (POTS).

According to an embodiment of the present invention, the network 162 may be a telecommunications network. The telecommunications network may include at least one of a computer network, the Internet, the Internet of Things (IoT), and a telephone network. According to an embodiment of the present invention, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

The control module 170 pairs authentication information obtained via an authentication module with an object to which access is controlled. The control module 170 controls the display of images related to the object and the authentication information on the display 150. For example, an authentication module may obtain at least one of letters, numbers, signs, patterns or biometric data as authentication information. The display 150 may display objects or a valid period according to the type of authentication. As a touch input on the valid period moves a predetermined direction, the control module 170 may change the valid period. When the touch input on the valid period moves in a first direction, the control module 170 may extend the valid period. In contrast, when the touch input on the valid period moves in a second direction, the control module 170 may reduce the valid period. For example, the control module 170 may delete the authentication information related to the valid period, and then may perform at least one operation of (1) terminating the object related to the deleted authentication information, (2) unlocking other objects related to the deleted authentication information, or (3) replacing the authentication information of the object with another piece of authentication information.

According to an embodiment of the present invention, the control module 170 analyzes properties of the paired object, and retrieves other objects that are related to the properties. In addition, the control module 170 may make a group that includes the paired object and the other objects retrieved, and may pair the objects included in the group with the authentication information. The control module 170 may give priority to the groups on the basis of the properties of the objects in the groups, and may differentially pair the authentication information with the objects again according to the priority. The control module 170 executes the object that matches the authentication information, and counts the execution time of the object. If the counted time is within the valid period, the control module 210 may request re-authentication. The control module 170 performs the re-authentication operation via the authentication module related to the authentication information or via a predetermined authentication module.

An embodiment of the present invention provides a method and an apparatus for managing authentication in which objects are paired with each piece of authentication information and access to the object is controlled based on the input authentication information.

Figure 2:
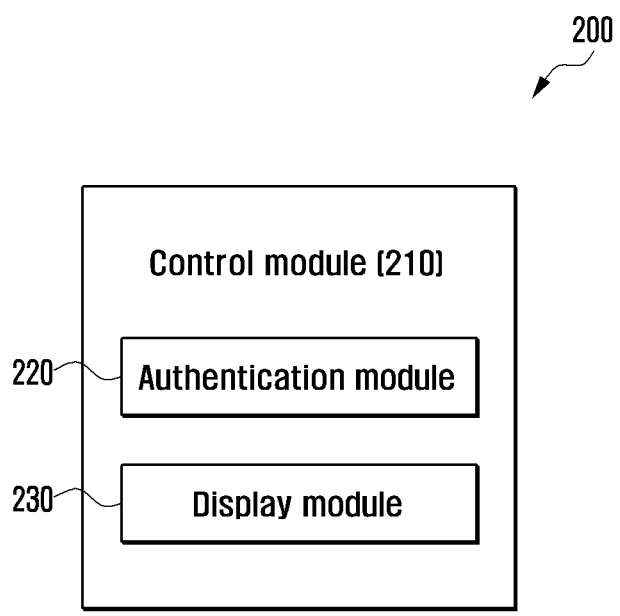
FIG. 2 is a block diagram of an electronic apparatus according to an embodiment of the present invention.

FIG. 2 is a block diagram of an electronic apparatus (e.g., the electronic apparatus 101) according to an embodiment of the present invention.

Referring to FIG. 2, the electronic apparatus 200 includes a control module 210, an authentication module 220, and a display module 230.

The authentication module 220 obtains authentication information. The authentication information may be at least one of letters, numbers, signs, patterns, or biometric data. The type of authentication module 220 may be different according to the authentication information. For example, if the authentication information is letters, numbers, or signs, the authentication module 220 may be a keypad. Alternatively, if the authentication information is patterns, the authentication module 220 may be a touch screen. Alternatively, if the authentication information is biometric data, the authentication module 220 may be a camera module or a fingerprint recognition sensor. If the biometric data is skin (such as the user's hands or palms) patterns, blood vessel patterns, or retinal patterns, various sensors, which are able to recognize the biometric data, are used as the authentication module 220.

The control module 210 pairs the authentication information with an object to which access is controlled. The object may include at least one piece of information stored in the electronic apparatus 200, and the information may include multimedia data, which includes at least one of text data, video data and audio data, applications, contact lists, or notes. The control module 210 pairs the object with each piece of authentication information, according to a user setup or a setup in the electronic apparatus 200. Since the object and the authentication information are paired with each other, the user must input correct authentication information corresponding to the object in order to access the object. In other words, the object is locked by the authentication information, so access to the object requires authentication information that matches the object.

The display module 230 displays images related to the object and the authentication information. The electronic apparatus 200 displays data or applications, such as phone calls, messages, contact lists, notes, or music, in the form of icons. That is, the objects are displayed as images (e.g., icons) to allow the user to intuitively recognize the objects. Hence, the display module 230 displays the images related to the objects and the authentication information corresponding to the objects so that the user can identify which authentication information has locked the object at a glance. Moreover, the display module 230 displays the authentication information in order of authentication or according to the type of authentication. In other words, the display module 230 sequentially displays the authentication information in order of authentication, or may discretely display the authentication information in accordance with the type of authentication.

According to an embodiment of the present invention, the control module 210 may change the authentication information. When a menu is selected to change the authentication information, the display module 230 displays the objects according to the type of authentication or the valid period. The type of authentication refers to letters, numbers, signs, patterns, fingerprint recognition, or iris recognition. As a touch input on the valid period moves in a predetermined direction while touching the valid period, the control module 210 changes the valid period. The control module 210 may extend the valid period when the touch input on the valid period moves in a first direction. In contrast, the control module 210 may reduce the valid period when the touch input on the valid period moves in a second direction. The first direction and the second direction may be opposite to each other. For example, if the first direction is directed to the right, the second direction may be directed to the left. Alternatively, if the first direction is directed upwards, the second direction may be directed downwards.

When a request for a reduction of the valid period is received, the control module 210 deletes the authentication information according to the touch input. For example, if the touch input moves in a second direction a second time, moves in a third direction, or if the touch input is maintained for long period of time (e.g., more than 2 seconds) on the valid period, the control module 210 interprets the touch input as a request for deleting the authentication information. The control module 210 deletes the authentication information related to the valid period. When the authentication information is deleted, the control module 210 terminates the object related to the deleted authentication information. For example, if the authentication information is deleted during the execution of the object or when the object is in an idle state, the control module 210 forces the object to be terminated. Alternatively, the control module 210 unlocks other objects related to the deleted authentication information. In other words, in the case where one or more objects are paired with the authentication information, if the authentication information is deleted, the control module 210 unlocks the other objects that match the deleted authentication information. The control module 210 may replace the authentication information of the object with another piece of authentication information. When the authentication information is deleted, the object paired with the deleted authentication information may be released from the locked state to be freely accessed. In this case, the control module 210 may replace the authentication information of the object related to the deleted authentication information with another piece of authentication information, in order to prevent an invasion of privacy and information leakage.

According to an embodiment of the present invention, the control module 210 analyzes the properties of the paired object and retrieves other objects which are related to the properties. For example, if the user has paired a single object with the authentication information, the control module 210 retrieves other objects that have similar or identical properties to the object. The control module 210 creates a group that includes the paired object and the other objects retrieved, and pairs the objects included in the group with the authentication information. Therefore, although the user pairs the authentication information with a single object, the control module 210 automatically pairs the authentication information with other objects that are identical or similar to the single object, so the convenience of the user can be enhanced. Then, the control module 210 gives priority to the groups on the basis of the properties of the objects in the groups, and differentially pairs the authentication information with the objects again according to the priority. For example, a high priority group may be paired with the authentication information that requires higher accuracy for authentication. Photos and contact lists tend to include more pieces of private information than music, so the object properties of the photos or the contact lists may have higher priority than that of music. The control module 210 gives higher priority to the group including more pieces of private information on the basis of the properties of the object in the group. Fingerprint recognition may be more accurate for user authentication than passwords or lock patterns, and iris recognition may be more accurate for user authentication than fingerprint recognition. The control module 210 may effectively manage the authentication information by differentially pairing the authentication information with the objects again in order of priority.

According to an embodiment of the present invention, the control module 210 executes the object that matches the authentication information, and counts the execution time of the object in order to compare the same with the valid period of the authentication information. If the counted execution time is within the valid period, the control module 210 makes a request to the user for re-authentication. When the object is executed, the control module 210 counts the execution time, and makes a request to the user for re-authentication before the valid period expires. For example, if the valid period is 1 hour and the execution time counted by control module 210 is 59 minutes, re-authentication is requested. The control module 210 performs re-authentication via either the authentication module 220 related to the authentication information or a predetermined authentication module. The control module 210 performs re-authenticate using the last authentication information or new authentication information. For example, the new authentication information may be "iris authentication" while the last authentication information was "password." If the initial authentication information is no longer valid or if the re-authentication fails, the control module 210 terminates the object that has been requested for execution or that is in progress, or provides transformed information on the object.

An electronic apparatus, according to an embodiment of the present invention, includes an authentication module 220 that obtains authentication information; a control module 210 that pairs the authentication information with an object to which access is to be controlled; and a display module 230 that displays an image related to the object together with the authentication information.

The authentication module 220 obtains, as the authentication information, at least one of letters, numbers, signs, patterns, or biometric data.

The display module 230 displays the object or a valid period according to the type of authentication, and as a touch input on the valid period moves in a predetermined direction, the control module 210 changes the valid period.

The control module 210, if the touch input on the valid period moves in a first direction, extends the valid period, and if the touch input on the valid period moves in a second direction, reduces the valid period.

The control module 210, if the authentication information related to the valid period is deleted, performs at least one operation of (1) terminating the object related to the deleted authentication information, (2) unlocking other objects related to the deleted authentication information, or (3) replacing the authentication information of the object with another piece of authentication information.

The control module 210 analyzes the properties of the paired object, retrieves other objects related to the properties, makes a group that includes the paired object and the retrieved other objects, and pairs the authentication information with the objects in the group.

The control module 210 gives priority to the groups on the basis of the properties of the objects in the groups, and differentially pairs the authentication information with the objects again according to the priority.

The control module 210 executes the object that matches the authentication information, counts the execution time of the object, and if the counted time is within the valid period, requests re-authentication.

The control module performs the re-authentication via an authentication module 220 related to the authentication information, or performs the re-authentication via a predetermined authentication module.

Figure 3:
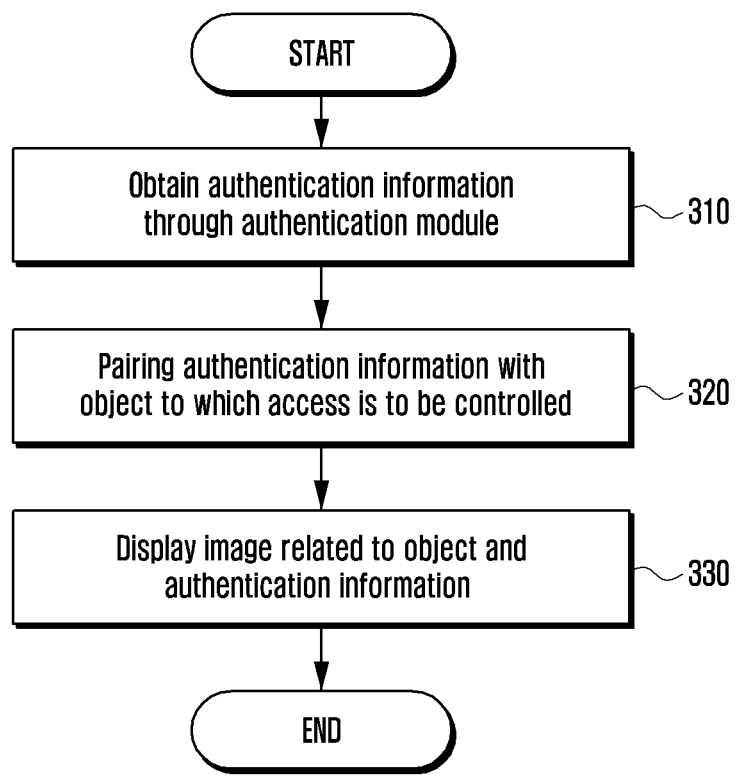
FIG. 3 is a flowchart of a method for managing authentication according to an embodiment of the present invention.

FIG. 3 is a flowchart illustrating a method for managing authentication according to an embodiment of the present invention. The method for managing authentication of the present invention may be executed by the electronic apparatus.

Referring to FIG. 3, in step 310, the electronic apparatus obtains the authentication information via the authentication module. The authentication information may be at least one of letters, numbers, signs, patterns, or biometric data. The electronic apparatus may use different authentication modules depending on the authentication information.

Figure 4:
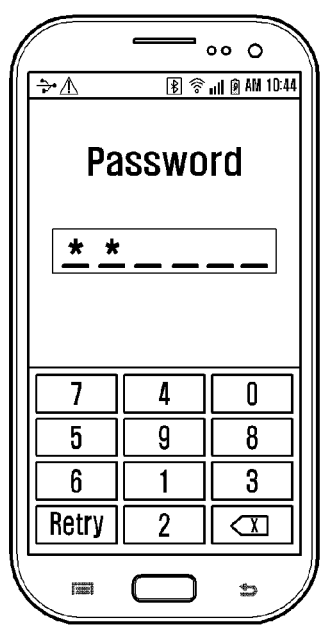
FIG. 4 illustrates an example of obtaining authentication information according to an embodiment of the present invention.
Figure 4:
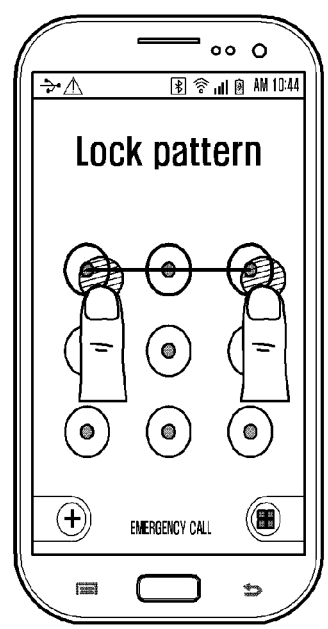
Figure 4:
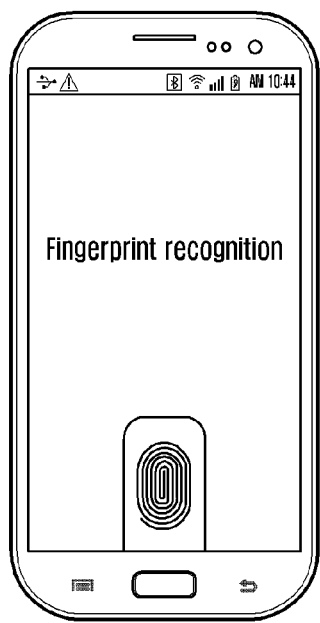
Figure 4:
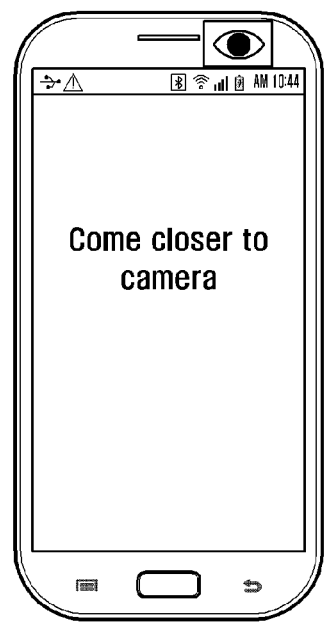

FIG. 4 illustrates an example of obtaining authentication information according to an embodiment of the present invention.

Referring to FIG. 4, in the case where the authentication information is a password including at least one of letters, numbers, or signs (see numeral 410), the electronic apparatus provides a keypad as the authentication module. The electronic apparatus receives an input of at least one of letters, numbers or signs, which are provided via the keypad, as the authentication information.

In the case where the authentication information is a pattern (see numeral 420), the electronic apparatus provides a touch screen, which is able to recognize patterns, as the authentication module. The touch screen may be a combined form of a display module and an input module, and a coordinate value may be obtained by touching the display module. For example, the touch screen may display a virtual pattern for receiving a pattern input, and then the user may input his or her own pattern along the virtual pattern.

According to an embodiment of present invention, the authentication information may be biometric data. The biometric data may be more safe and more accurate than a password or a pattern input. For example, the electronic apparatus may use various sensors that are able to detect the biometric data in the case of obtaining biometric data as the authentication information. In the case where the authentication information is fingerprint recognition (see numeral 430), the electronic apparatus provides a fingerprint recognition sensor as the authentication module. The fingerprint recognition sensor may be included in the display module, such as a touch screen, in whole or in part, and when the user touches the touch screen by his or her finger, the user's fingerprint is detected. In the case where the authentication information is iris recognition (see numeral 440), the electronic apparatus provides a camera module as the authentication module. The camera module includes a sensor that can recognize the iris of a user when the user's eyes approach the camera module within a predetermined distance. In addition, in the case of obtaining biometric data such as skin (hands or palms) patterns, blood vessel patterns, or retinal patterns, the electronic apparatus provides various sensors capable of detecting the biometric data as the authentication module.

Referring to FIG. 3, in step 320, the electronic apparatus pairs the authentication information with the object to which access is controlled by the authentication information. The object may include at least one piece of information that is stored in the electronic apparatus, which includes multimedia data including at least one of text data, video data and audio data, applications, contact lists, or notes. The electronic apparatus pairs the object that is selected by the user with the authentication information. In addition, the electronic apparatus may pair one or more objects with the authentication information as a default. Access to the object is controlled according to the authentication information. That is, user access to the object may be approved or refused according to the validity of the authentication information. For example, if the authentication information is valid, the user's access to the object is approved, and if the authentication information is not valid, user access to the object is denied. If the input authentication information is identical to the initially obtained authentication information, the authentication information may be regarded as valid. If the input authentication information is different from the initially obtained authentication information, the authentication information may be regarded as invalid.

According to an embodiment of the present invention, the electronic apparatus converts the object into an idle state after pairing the authentication information with the object. In general, in order to execute the object, the electronic apparatus allows the user to select (e.g. touch) the object. When the object is selected, the electronic apparatus loads the information on the object into memory to thereby execute the object. However, it may take a significant time to load the information on the object into memory because the loading time of the information is different according to the objects. In the present invention, once the authentication information is paired with the object, the electronic apparatus determines that the user wishes to use the object. Accordingly, the electronic apparatus loads the information on the object into memory in advance, and then maintains the object in the idle state, in order to reduce the time for the execution of the object when the user selects the object. Then, if the user selects the object for use, the electronic apparatus quickly executes the object using the information preliminarily loaded into memory.

In step 330, the electronic apparatus displays images related to the object and the authentication information. The electronic apparatus displays data or applications, such as phone calls, messages, contact lists, notes, or music, in the form of icons. That is, the objects are displayed as images (e.g., icons) to allow the user to intuitively recognize the objects. The electronic apparatus displays the object together with the authentication information related thereto so that the user can intuitively identify which authentication information has locked the object. Then, the electronic apparatus sequentially displays the authentication information in order of authentication, or discretely displays the authentication information according to the type of authentication.

A method for managing authentication, according to an embodiment of the present invention includes obtaining authentication information via an authentication module; pairing the authentication information with an object to which access is controlled; and displaying an image related to the object together with the authentication information.

Obtaining authentication information includes obtaining at least one of letters, numbers, signs, patterns, or biometric data.

The method of managing authentication further includes displaying the object and a valid period according to the type of authentication; and as a touch input on the valid period moves in a predetermined direction, changing the valid period.

Changing the valid period includes, if the touch input on the valid period moves in the first direction, extending the valid period.

Changing of the valid period includes, if the touch input on the valid period moves in a second direction, reducing the valid period.

Reducing the valid period includes deleting the authentication information related to the valid period; and terminating the object related to the deleted authentication information.

Reducing the valid period includes deleting the authentication information related to the valid period; and unlocking other objects related to the deleted authentication information, or replacing the authentication information of the object with another piece of authentication information.

In the method of managing authentication, access to the object may be controlled according to the validity of the authentication information.

Pairing authentication information with an object to which access is controlled includes analyzing the properties of the paired object; retrieving other objects related to the properties; making a group that includes the paired object and the retrieved other objects; and pairing the authentication information with the objects in the group.

The method of managing authentication includes giving priority to the groups on the basis of the properties of the objects in the groups; and differentially pairing the authentication information again according to the priority.

Pairing authentication information with an object to which access is controlled includes executing the object that matches the authentication information; counting the execution time of the object; and if the counted time is within the valid period, requesting re-authentication.

Requesting re-authentication includes performing re-authentication via an authentication module related to the authentication information, or performing re-authentication via a predetermined authentication module.

Requesting re-authentication includes, if the authentication fails, terminating the object in progress, or providing transformed information on the object.

Displaying an image related to the object together with the authentication information includes displaying the image related to the object together with the authentication information in order of authentication or according to the type of authentication.

Figure 5:
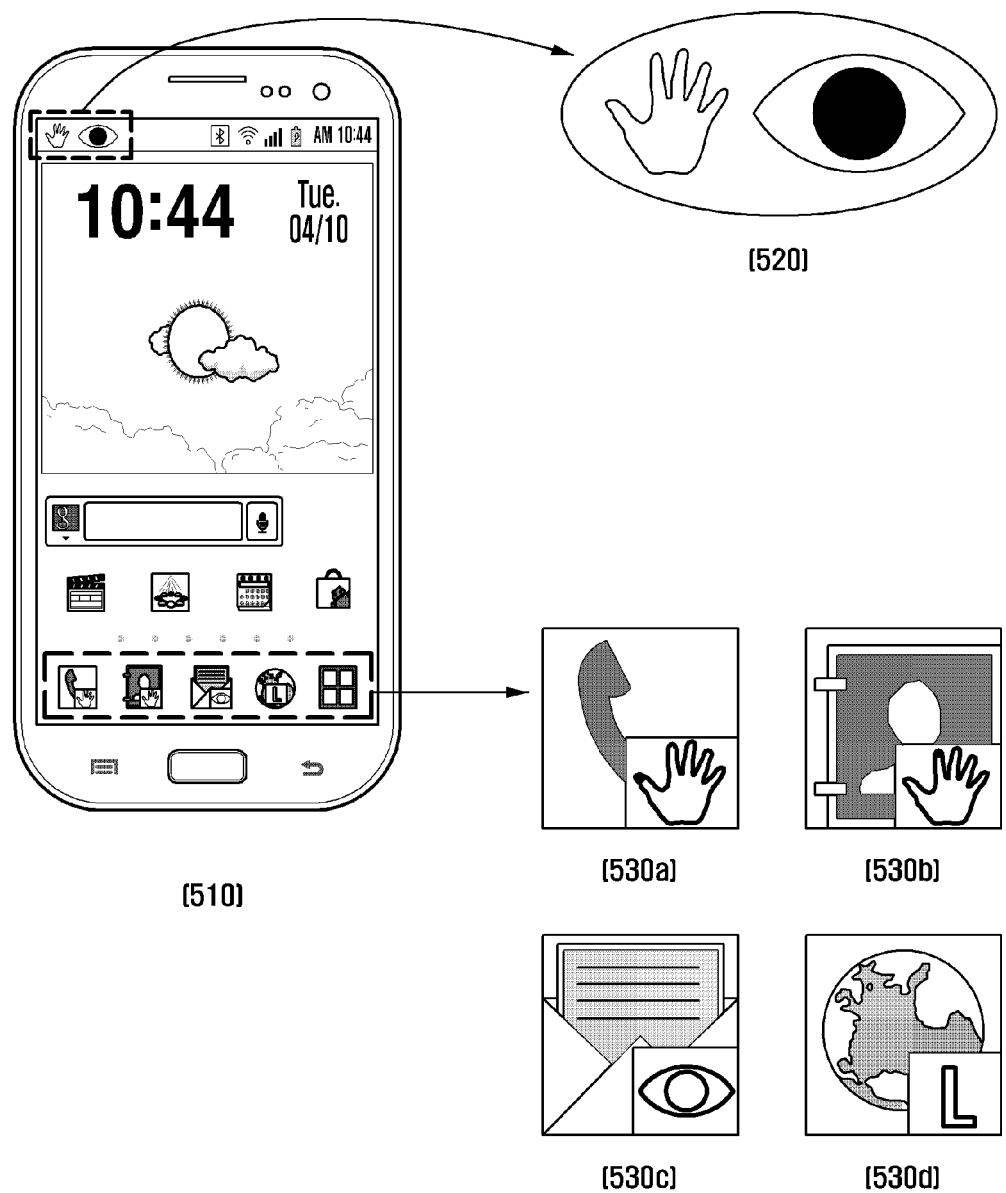
FIG. 5 illustrates an example of displaying authentication information a related to an object according to an embodiment of the present invention.

FIG. 5 illustrates an example of displaying authentication information related to an object according to an embodiment of the present invention.

Referring to FIG. 5, the electronic apparatus simultaneously displays images (e.g., icons) related to objects and the authentication information related to the objects (see numeral 510). For example, the electronic apparatus simultaneously display object of "phone calls" and the authentication information of "fingerprint recognition (thumbs)" (see numeral 530a). The electronic apparatus simultaneously displays the object of "contact lists" and the authentication information of "fingerprint recognition (index fingers)" (see numeral 530b). The electronic apparatus simultaneously displays the object of "messages" and the authentication information of "iris recognition" (see numeral 530c). The electronic apparatus simultaneously displays the object of "the Internet" and the authentication information of "password (L)" (see numeral 530d). In addition, the electronic apparatus sequentially displays the authentication information in order of authentication, or may discretely display the authentication information according to the type of authentication (see numeral 520). The electronic apparatus displays the sequence of authentication and the type of authentication in the status area that shows the status of the electronic apparatus. The status area shows Received Signal Strength Indication (RSSI), power status, the Internet connection, date and time, or the like.

According to an embodiment of the present invention, the electronic apparatus analyzes the properties of the paired objects and retrieves other objects which are related to the properties. In addition, the electronic apparatus creates a group that includes the paired objects and the other retrieved objects, and pairs the objects included in the group with the authentication information. The electronic apparatus gives priority to the groups on the basis of the properties of the objects in the groups, and differentially pairs the authentication information with the objects again according to the priority.

Figure 6A:
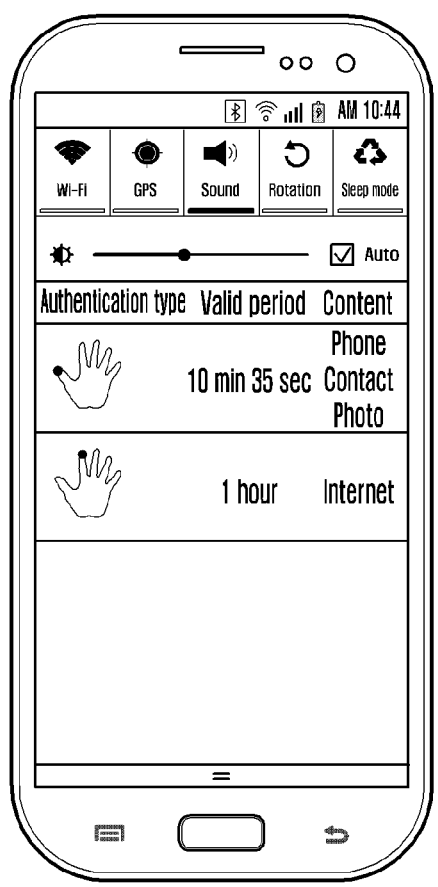
FIGS. 6A to 6C illustrate an example of pairing authentication information according to an embodiment of the present invention.
Figure 6A:
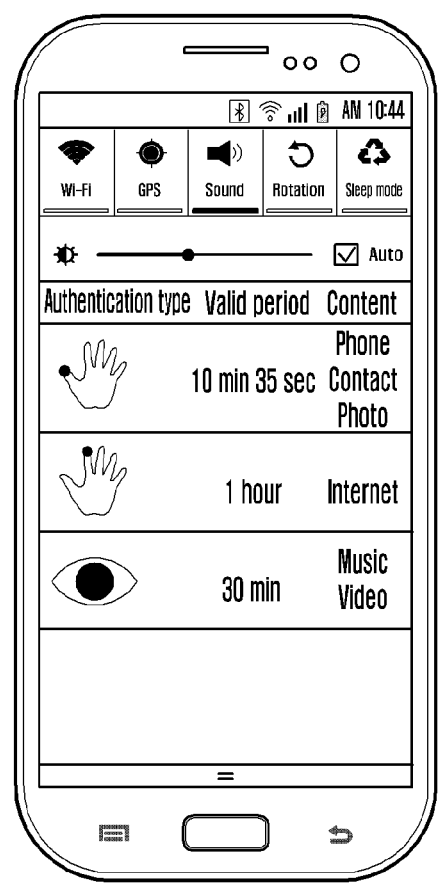
Figure 6B:
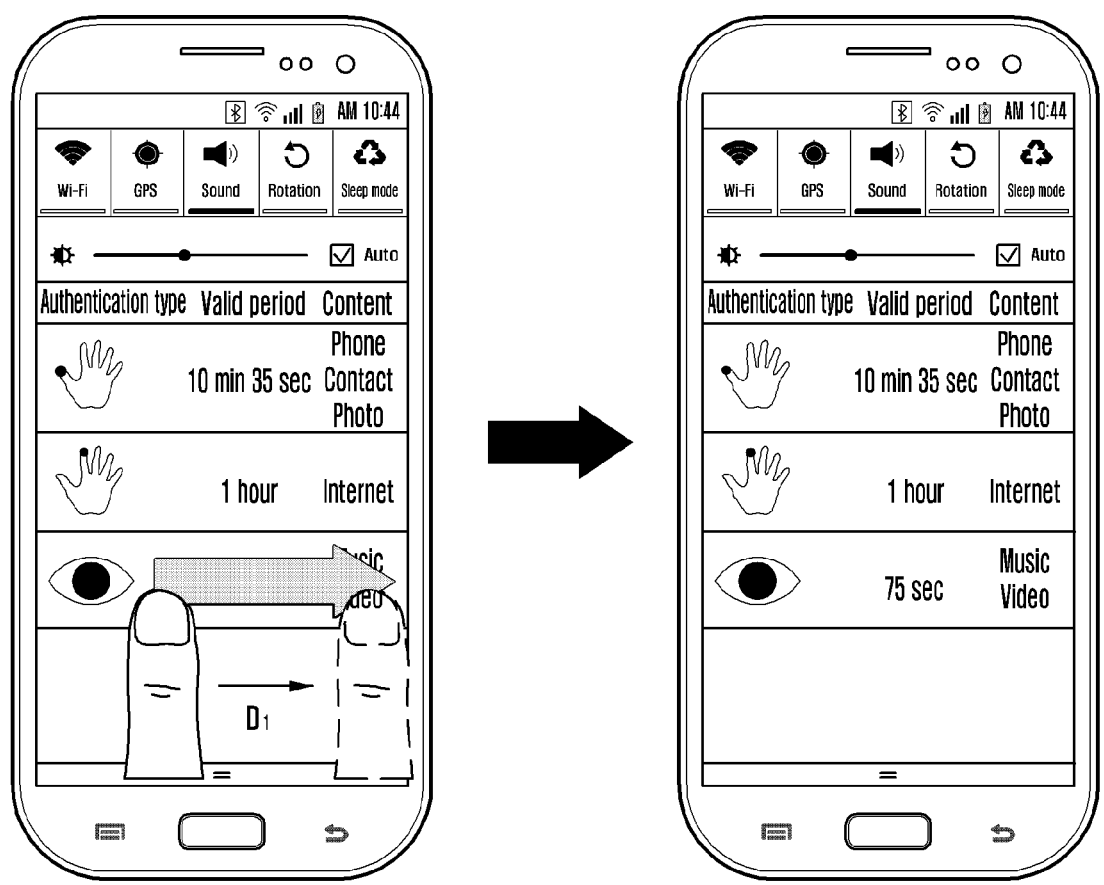
Figure 6C:
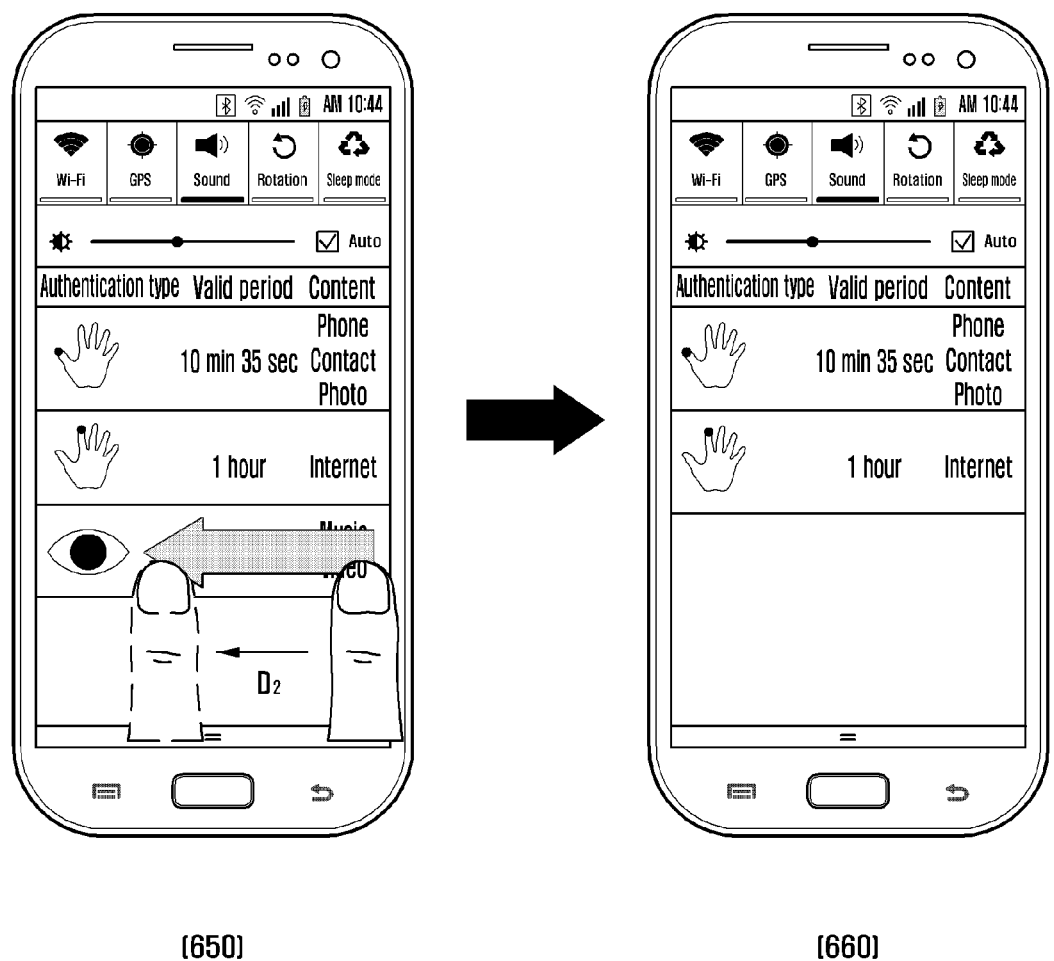

FIGS. 6A to 6C illustrate an example of pairing the authentication information according to an embodiment of the present invention.

In a case where an object of "contact lists" is paired with authentication information of "thumb fingerprint recognition," the electronic apparatus retrieves the objects of "phone calls" and "photos," which have identical or similar properties to the object "contact lists." The electronic apparatus makes a group of the objects corresponding to the contact lists, the phone calls, and the photos, and pairs the authentication information of "thumb fingerprint recognition" with the objects included in the group. In addition, in a case where an object of "the Internet" is paired with authentication information of "index finger fingerprint recognition," the electronic apparatus retrieves other objects that have identical or similar properties to the object of "the Internet." If other objects are not retrieved, the electronic apparatus makes a group of a single object of "the Internet," and pairs the authentication information of "index finger fingerprint recognition" with the object included in the group.

Referring to FIG. 6A, the electronic apparatus displays the objects according to the type of authentication and the valid period (see numeral 610). The type of authentication refers to thumb fingerprint recognition or index finger fingerprint recognition among fingerprint recognition, passwords, lock patterns, iris recognition, or the like. The valid period refers to the time period for which access to the object is approved by the authentication information. The valid period may vary with the type of authentication or the objects. The valid period may be configured by the user, or may be automatically configured by the electronic apparatus according to the type of authentication or the objects. The electronic apparatus may request re-authentication before the valid period expires. The electronic apparatus pairs the authentication information of "iris recognition" with the object "music," and configures the valid period to be 30 minutes (see numeral 620). With the authentication information of "iris recognition" paired with the object "music," the electronic apparatus retrieves the object "videos" that has identical or similar properties to the object "music." The electronic apparatus makes a group of the objects "music" and "videos," and pairs the authentication information of "iris recognition" with the objects included in the group.

Then, the electronic apparatus gives priority to the groups on the basis of the properties of the objects in the groups, and differentially pairs the authentication information with the objects again according to the priority. For example, a high priority group may be paired with the authentication information that requires higher accuracy for authentication. Photos and contact lists tend to include more pieces of private information than music, so the object properties of the photos or the contact lists may have higher priority than that of music. The electronic apparatus may give higher priority to the group including more pieces of private information on the basis of the properties of the object in the group. With regard to user authentication, fingerprint recognition may be more accurate than passwords or lock patterns, and iris recognition may be more accurate than fingerprint recognition. The electronic apparatus effectively manages the authentication information by differentially pairing the authentication information with the objects in order of priority.

According to an embodiment of the present invention, as the touch input on the valid period moves in a predetermined direction, the electronic apparatus changes the valid period.

Referring to FIG. 6B, when the touch input on the valid period related to the authentication information "iris recognition" moves in the first direction $D_1$ (see numeral 630), the electronic apparatus extends the valid period. In this case, the first direction $D_1$ may denote that the touch input moves up, down, to the left, or to the right. The electronic apparatus may extend the valid period to an extent of a reference time. If the touch input on the valid period related to the authentication information "iris recognition" moves in the first direction, the electronic apparatus extends the valid period from "30 seconds" to "75 seconds" (see numeral 640). Then, the reference time may be "35 seconds." For example, the reference time may be configured by the electronic apparatus as a default, or by the user.

Referring to FIG. 6C, when the touch input on the valid period moves in a second direction (see numeral 650), the electronic apparatus reduces or deletes the valid period. In this case, the first direction may be opposite to the second direction. For example, the first direction may be right, and the second direction may be left. Alternatively, the first direction may be up, and the second direction may be down. If the touch input on the valid period related to the authentication information "iris recognition" moves in the second direction, the electronic apparatus reduces the valid period from "30 seconds" to "10 seconds." After reducing the valid period, the electronic apparatus may delete the authentication information according to the following touch input (see numeral 660). For example, if the touch input moves in the second direction a second time, moves in a third direction, or if the touch input remains in place for a significant period of rime (e.g., more than 2 seconds) on the valid period, the electronic apparatus determines the touch input as a request for deleting the authentication information and deletes the authentication information related to the valid period.

According to an embodiment of the present invention, the electronic apparatus terminates the object related to the deleted authentication information. For example, if the authentication information is deleted during the execution of the object or while the object is in the idle state, the electronic apparatus forces the object to be terminated. Alternatively, the electronic apparatus may unlock other objects related to the deleted authentication information. That is, in the case where one or more objects are paired with the authentication information, if the authentication information is deleted, the electronic apparatus may unlock other objects that match the deleted authentication information. The electronic apparatus may replace the authentication information of the object with another piece of authentication information. When the authentication information is deleted, the object matching with the deleted authentication information may be released from the locked state to be freely accessed. In this case, the electronic apparatus may replace the authentication information of the object related to the deleted authentication information with another piece of authentication information, in order to prevent an invasion of privacy and information leakage.

According to an embodiment of the present invention, the electronic apparatus executes the object that matches the authentication information, and counts the execution time of the object. If the counted execution time is within the valid period, the electronic apparatus may request re-authentication.

Figure 7A:
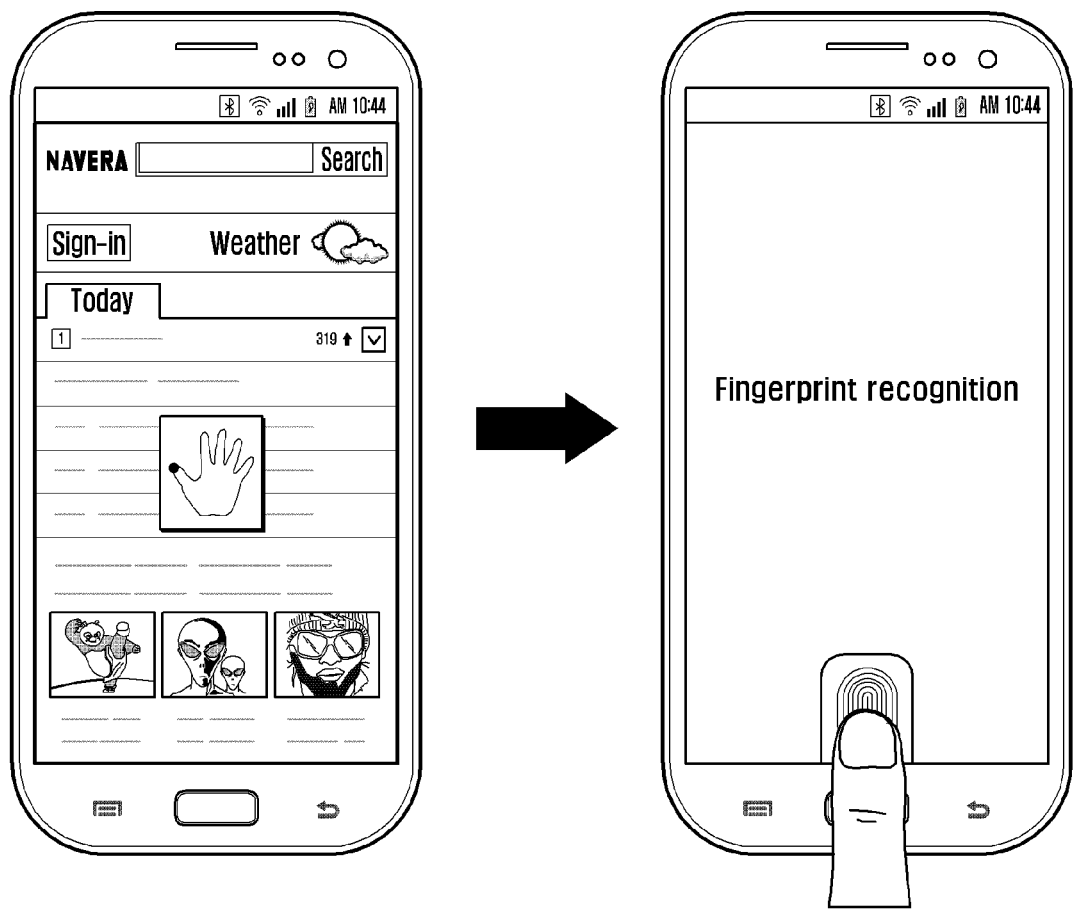
FIGS. 7A and 7B illustrate an example of requesting re-authentication with respect to an object according to an embodiment of the present invention.
Figure 7B:
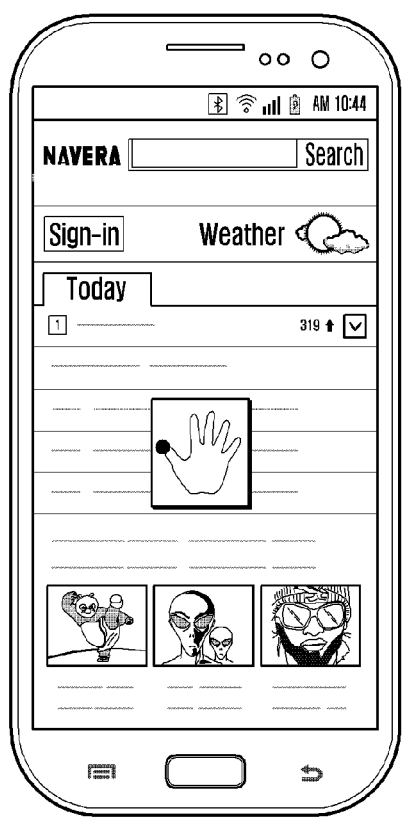
Figure 7B:
Figure 7B:
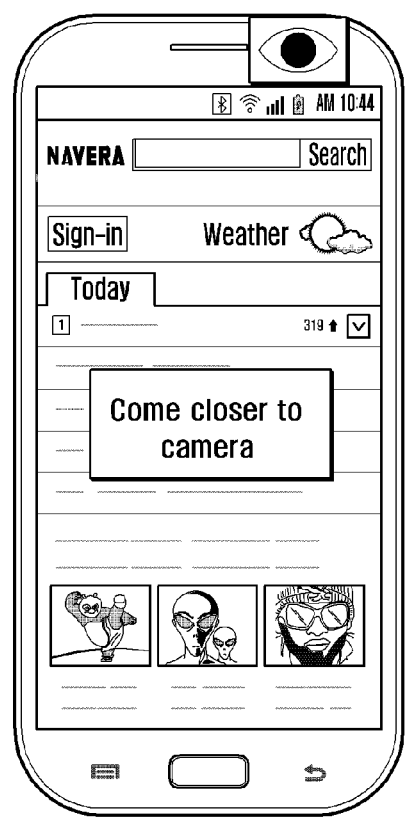

FIGS. 7A and 7B illustrate an example of requesting re-authentication with respect to an object according to an embodiment of the present invention.

Referring to FIG. 7A, when the object of "the Internet" corresponding to the authentication of "fingerprint recognition" is executed, the electronic apparatus counts the execution time of the object. In this case, the electronic apparatus may adopt a timer. If the counted time is within the valid period, the electronic apparatus may request re-authentication (see numeral 710). For example, in requesting the re-authentication, the electronic apparatus may display the authentication information of "fingerprint recognition" related to the object of "the Internet." The electronic apparatus performs re-authentication by the same authentication information (see numeral 720).

Referring to FIG. 7B, the electronic apparatus displays the authentication information of "fingerprint recognition" related to the executed or running object of "the Internet," and requests re-authentication (see numeral 730). In this case, the electronic apparatus performs re-authentication via a predetermined authentication module (see numeral 740). That is, the electronic apparatus may perform the re-authentication using new authentication information. For example, in the case where the last authentication information was "fingerprint authentication," the new authentication information may be "iris recognition." A new pop-up window is provided to replace the fingerprint recognition of the current window, which is removed, but this may be very tiresome for the user. However, since the iris recognition only requires the camera module without a new pop-up window, it may be more convenient than fingerprint recognition. Accordingly, in order to enhance user convenience, the electronic apparatus performs iris recognition via the camera module to perform re-authentication.

According to an embodiment of the present invention, if authentication fails, the electronic apparatus terminates the running object or provides transformed information on the object.

Figure 8A:
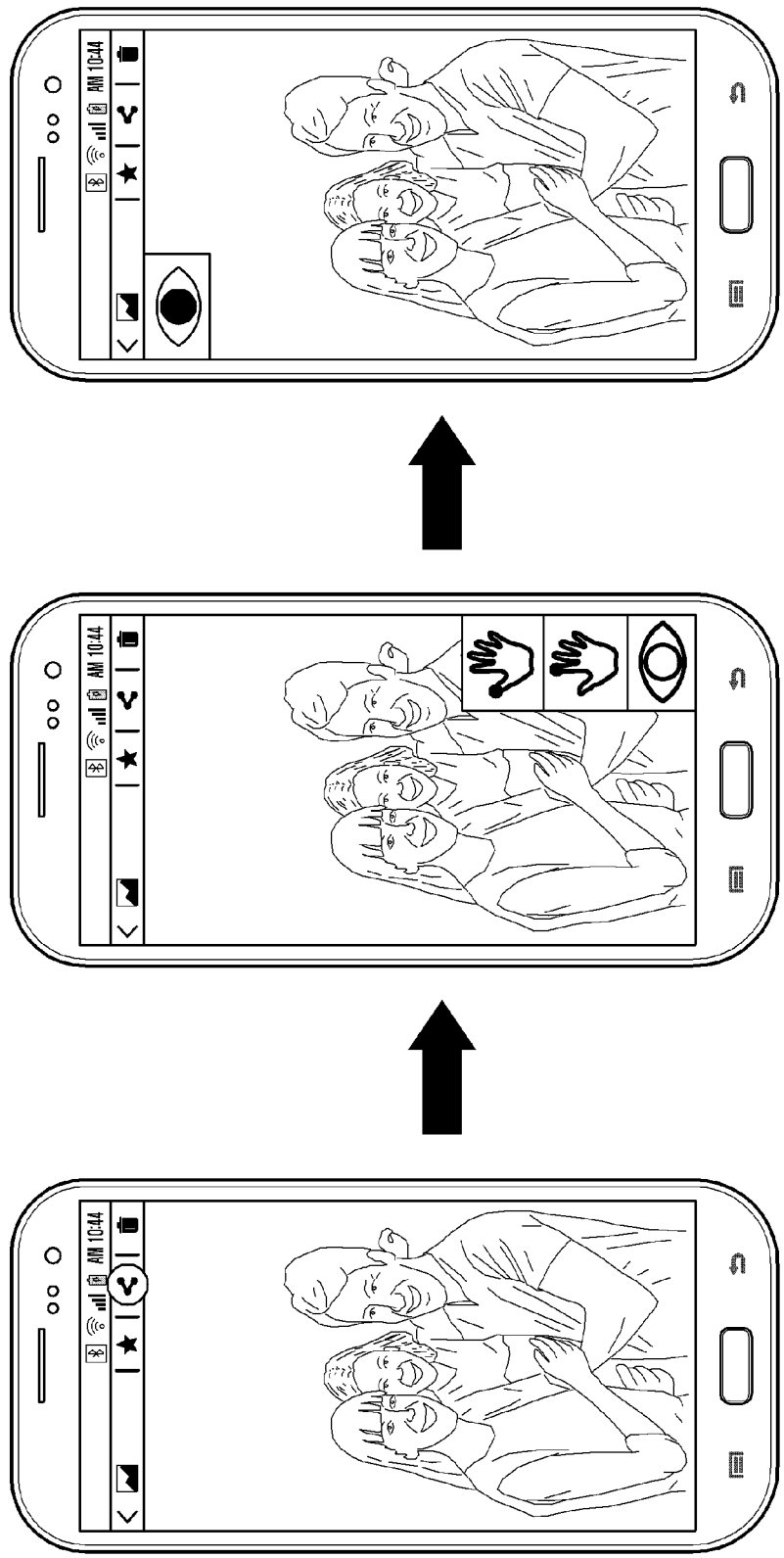
FIGS. 8A and 8B illustrate an example of requesting authentication when an object is executed according to an embodiment of the present invention.
Figure 8B:
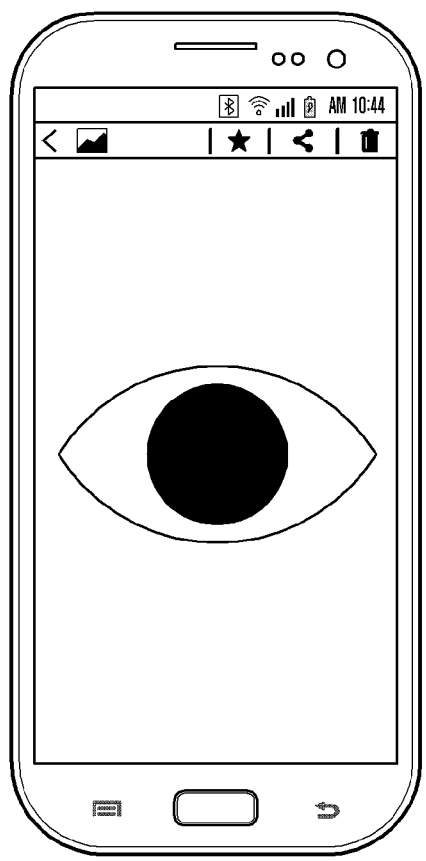
Figure 8B:
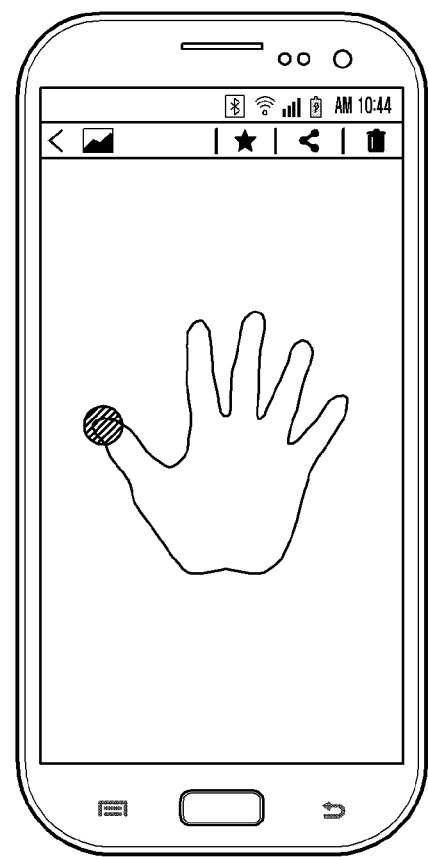

FIGS. 8A and 8B illustrate an example of requesting authentication when an object is executed according to an embodiment of the present invention.

Referring to FIG. 8A, in executing the object of "camera application" or "photos," the electronic apparatus performs a matching operation of the authentication information (see numeral 810). The electronic apparatus shows that the object is locked by the fingerprint recognition and the iris recognition (see numeral 820). Alternatively, the electronic apparatus may show that the object is locked by the iris recognition (see numeral 830).

Referring to FIG. 8B, if the initial authentication information is no longer valid, or if the re-authentication fails, the electronic apparatus terminates the object that has been requested or that is in progress, or provides transformed information on the object (see numerals 840 and 850). The transformed information may be the information in which the original object is transformed, or may be new information. The electronic apparatus displays an available authentication type (e.g., iris recognition, or fingerprint recognition) which can be authenticated by the transformed information.

According to an embodiment of the present invention, the electronic apparatus displays the images related to the object together with the authentication information related to the object so that the user can easily identify the authentication information corresponding to each object.

According to an embodiment of the present invention, the electronic apparatus identifies the valid period of the authentication information matching the executed object, and requests the re-authentication before the valid period expires, to thereby effectively control access to the object.

Figure 9:
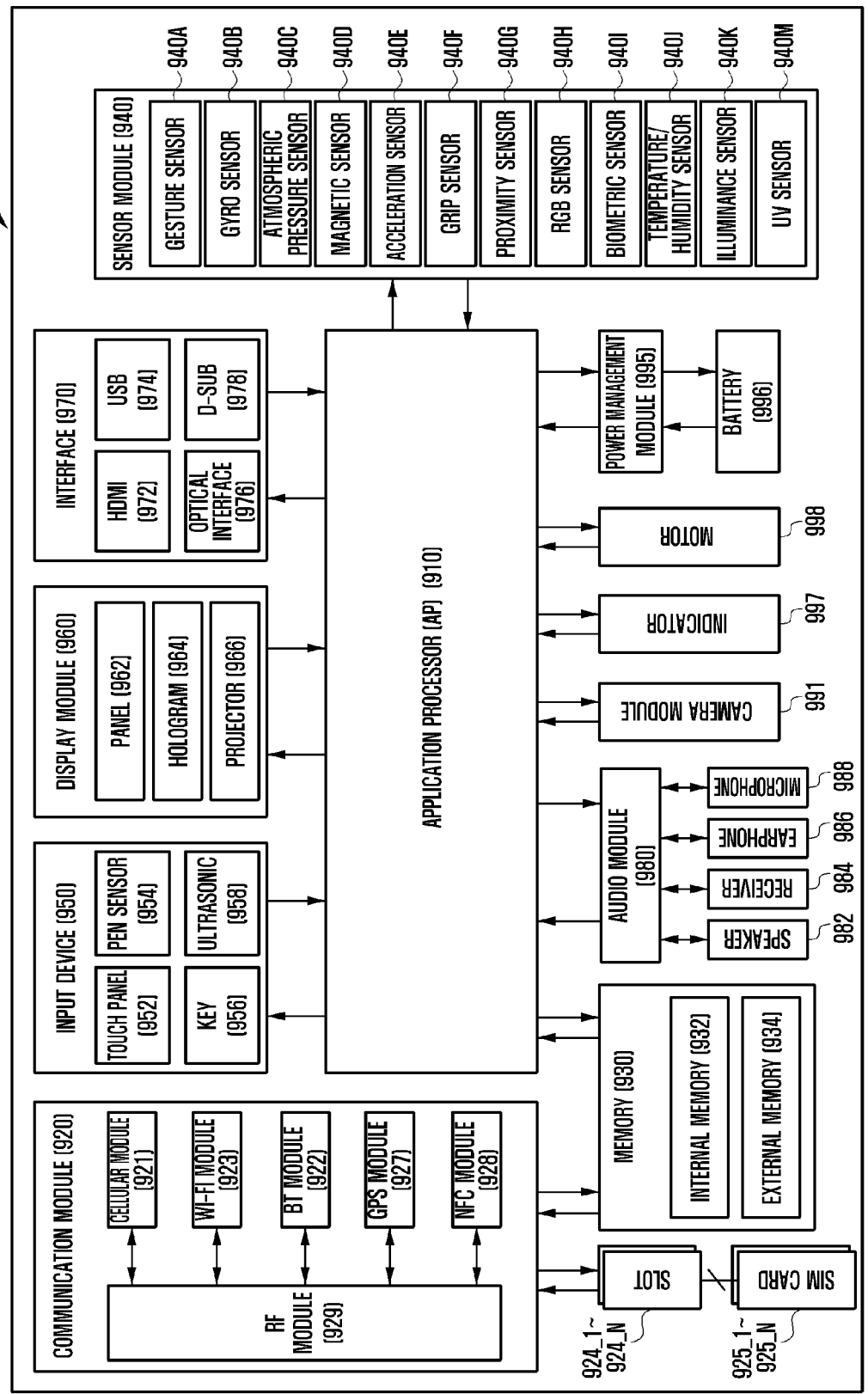
FIG. 9 is a block diagram of an electronic device according to an embodiment of the present invention.

FIG. 9 is a block diagram of an electronic device 900 according to an embodiment of the present invention. The electronic device 900, for example, may constitute all or a part of the electronic device 101 shown in FIG. 1.

Referring to FIG. 9, the electronic device 900 includes at least one Application Processor (AP) 910, a communication module 920, at least one Subscriber Identity Module (SIM) card slot 924_1 to 924_N, a memory 930, a sensor module 940, an input device 950, a display module 960, an interface 970, an audio module 980, a camera module 991, a power management module 995, a battery 996, an indicator 997, and a motor 998.

The AP 910 drives an operating system or an application program to control a plurality of hardware or software components connected to the AP 910, and performs processing and operations of various data including multimedia data. The AP 910, for example, may be implemented as a System on Chip (SoC). According to an embodiment of the present invention, the AP 910 may further include a Graphics Processing Unit (GPU).

The communication module 920 (e.g., the communication interface 160) performs data transmission/reception in communication with other electronic devices (e.g., the electronic device 104 and the server 106) connected to the electronic device 900 (e.g., the electronic device 101) via a network. According to an embodiment of the present invention, the communication module 920 may include a cellular module 921, a WiFi module 923, a BT module 922, a GPS module 927, an NFC module 928, and a Radio Frequency (RF) module 929.

The cellular module 921 provides a voice call, a video call, an SMS service, an Internet service, and the like via a communication network (e.g., LTE, LTE-A, CDMA, WCDMA, UMTS, WiBro, or GSM). Also, the cellular module 921 identifies and authenticates an electronic device in a communication network by using, for example, a SIM card. According to an embodiment of the present invention, the cellular module 921 performs at least some of the functions that may be provided by the AP 910. For example, the cellular module 921 may perform at least a multimedia control function.

According to an embodiment of the present invention, the cellular module 921 may include a Communication Processor (CP). Further, the cellular module 921, for example, may be implemented as a SoC. Although the cellular module 921 (e.g., a CP), the memory 930, the power management module 995, and the like are shown as separate elements from the AP 910 in FIG. 9, the AP 910 may be implemented to include at least some (e.g., the cellular module 921) of the aforementioned elements according to an embodiment of the present invention.

According to an embodiment of the present invention, the AP 910 or the cellular module 921 (e.g., a CP) loads a command or data received from at least one of a non-volatile memory and other elements connected thereto into a volatile memory and processes the loaded command or data. Further, the AP 910 or the cellular module 921 stores data received from or generated by at least one of other elements in a non-volatile memory.

Each of the WiFi module 923, the BT module 922, the GPS module 927, and the NFC module 928, for example, may include a processor for processing data transmitted or received via the corresponding module. Although the cellular module 921, the WiFi module 923, the BT module 922, the GPS module 927, and the NFC module 928 are shown as separate blocks in FIG. 9, at least some (e.g., two or more) of the cellular module 921, the WiFi module 923, the BT module 922, the GPS module 927, and the NFC module 928 may be included in one Integrated Circuit (IC) or one IC package according to an embodiment of the present invention. For example, at least some processors corresponding to the cellular module 921, the WiFi module 923, the BT module 922, the GPS module 927, and the NFC module 928 respectively (e.g., a CP corresponding to the cellular module 921 and a WiFi processor corresponding to the WiFi module 923) may be implemented as one SoC.

The RF module 929 performs data transmission/reception, for example RF signal transmission/reception. The RF module 929, for example, may include a transceiver, a Power Amplifier Module (PAM), a frequency filter, a Low Noise Amplifier (LNA), and the like. Also, the RF module 929 may further include a component for transmitting/receiving an electromagnetic wave over the air in wireless communication, such as a conductor or a conducting wire. Although FIG. 9 shows that the cellular module 921, the WiFi module 923, the BT module 922, the GPS module 927, and the NFC module 928 share one RF module 929, at least one of the cellular module 921, the WiFi module 923, the BT module 922, the GPS module 927, and the NFC module 928 may perform RF signal transmission/reception via a separate RF module according to an embodiment of the present invention.

The at least one SIM card 925_1 to 925_N may be a card including a Subscriber Identification Module, and may be inserted into at least one slot 924_1 to 924_N formed in a location in the electronic device 900. The at least one SIM card 925_1 to 925_N may include unique identification information (e.g., Integrated Circuit Card Identifier (IC-CID)) or subscriber information (e.g., International Mobile Subscriber Identity (IMSI)).

The memory 930 (e.g., the memory 130) may include an internal memory 932 or an external memory 934. The internal memory 932, for example, includes at least one of a volatile memory (e.g., a Dynamic Random Access Memory (DRAM), a Static RAM (SRAM), or a Synchronous Dynamic RAM (SDRAM)) and a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or an NOR flash memory).

According to an embodiment of the present invention, the internal memory 932 may be a Solid State Drive (SSD). The external memory 934 may further include a flash drive, for example, a Compact Flash (CF) drive, a Secure Digital (SD) memory card, a Micro Secure Digital (Micro-SD) memory card, a Mini Secure Digital (Mini-SD) memory card, an extreme Digital (xD) memory card, or a memory stick. The external memory 934 may be functionally connected to the electronic device 900 via various interfaces. According to an embodiment of the present invention, the electronic device 900 may further include a storage device (or storage medium) such as a hard drive.

The sensor module 940 measures a physical quantity or detects an operation state of the electronic device 900 and converts the measured or detected information into an electrical signal. The sensor module 940, for example, may include at least one of a gesture sensor 940A, a gyro sensor 9408, an atmospheric pressure sensor 940C, a magnetic sensor 940D, an acceleration sensor 940E, a grip sensor 940F, a proximity sensor 940G, a color sensor 940H (e.g., a Red, Green and Blue (RGB) sensor), a biometric sensor 940I, a temperature/humidity sensor 940J, an illuminance sensor 940K, and an UltraViolet (UV) light sensor 940M. Additionally or alternatively, the sensor module 940, for example, may include an Electronic-nose (E-nose) sensor, an ElectroMyoGraphy (EMG) sensor, an ElectroEncephaloGram (EEG) sensor, an ElectroCardioGram (ECG) sensor, an InfraRed (IR) sensor, an iris scanner, and/or a fingerprint sensor. The sensor module 940 may further include a control circuit for controlling one or more sensors included therein.

The input device 950 may include a touch panel 952, a (digital) pen sensor 954, a key 956, or an ultrasonic input unit 958. The touch panel 952 that recognizes a touch input, for example, may include at least one of a capacitive touch panel, a resistive touch panel, an infrared touch panel, and an acoustic wave touch panel. Also, the touch panel 952 may further include a control circuit. When the touch panel is a capacitive touch panel, it may recognize physical contact or proximity contact. The touch panel 952 may further include a tactile layer. In this case, the touch panel 952 may provide a tactile response to a user.

The (digital) pen sensor 954, for example, may be implemented using a means identical or similar to a means for receiving a touch input from a user or using a separate recognition sheet. The key 956, for example, may include a physical button, an optical key, or a keypad. The ultrasonic input unit 958 is a unit that can identify data by generating an ultrasonic signal via an input tool and detecting a sonic wave via a microphone (e.g., the microphone 988) in the electronic device 900, and is capable of wireless recognition. According to an embodiment of the present invention, the electronic device 900 may also receive a user input from an external device (e.g., a computer or a server) connected thereto by using the communication module 920.

The display module 960 (e.g., the display 150) may include a panel 962, a hologram unit 964, or a projector 966. The panel 962, for example, may be a Liquid Crystal Display (LCD) or an Active Matrix-Organic Light Emitting Diode (AM-OLED). The panel 962, for example, may be implemented to be flexible, transparent, or wearable. The panel 962 may also be incorporated into one module together with the touch panel 952. The hologram unit 964 may show a stereoscopic image in the air by using light interference. The projector 966 may display an image by projecting light onto a screen. The screen, for example, may be located internally or externally to the electronic device 900. According to an embodiment of the present invention, the display module 960 may further include a control circuit for controlling the panel 962, the hologram unit 964, or the projector 966.

The interface 970, for example, may include a High-Definition Multimedia Interface (HDMI) 972, a Universal Serial Bus (USB) 974, an optical interface 976, or a D-sub-miniature (D-sub) connector 978. The interface 970, for example, may be included in the communication interface 160 shown in FIG. 1. Additionally or alternatively, the interface 990, for example, may include a Mobile High-definition Link (MHL) interface, a Secure Digital (SD) card/MultiMedia Card (MMC) interface, or an InfraRed Data Association (IrDA) interface.

The audio module 980 provides bidirectional conversion between a sound and an electrical signal. At least some elements of the audio module 980, for example, may be included in the input/output interface 140 shown in FIG. 1. The audio module 980, for example, may process sound information input or output via a speaker 982, a receiver 984, an earphone 986, or the microphone 988.

The camera module 991 is a device that can take both still and moving images, and according to an embodiment of the present invention, may include one or more image sensors (e.g., a front sensor or a rear sensor, not shown), a lens, an Image Signal Processor (ISP), or a flash (e.g., a Light Emitting Diode (LED) or xenon lamp).

The power management module 995 manages power of the electronic device 900. The power management module 995, for example, may include a Power Management Integrated Circuit (PMIC), a charger IC, or a battery gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment of the present invention, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 996. The battery 996 stores or generates electricity, and supplies power to the electronic device 900 by using the stored or generated electricity. The battery 996, for example, may include a rechargeable battery or a solar battery.

The indicator 997 displays status of the electronic device 900 or a part thereof (e.g., the AP 910), for example, a boot-up status, a message status, or a charging status. The motor 998 converts an electrical signal into a mechanical vibration. The electronic device 900 may include a processing unit (e.g., a GPU) for supporting a mobile TV. The processing unit for supporting a mobile TV may process media data pursuant to a standard, for example, Digital Multimedia Broadcasting (DMB), Digital Video Broadcasting (DVB), or media flow.

Each of the above described elements of the electronic device according to the present invention may be formed by one or more components, and the names of the corresponding elements may vary according to the type of the electronic device. The electronic device according to the present invention may include at least one of the above described elements, and may exclude some of the elements or further include other additional elements. Further, some of the elements of the electronic device according to the present invention may be coupled to form a single entity while performing the same functions as those of the corresponding elements before the coupling.

The embodiments disclosed in the present specifications and drawings were provided merely to readily describe and to facilitate a thorough understanding of the present invention but are not intended to limit the scope of the present invention. Therefore, it should be construed that all modifications or modified forms drawn by the technical idea of the present invention in addition to the embodiments disclosed herein are included in the scope of the present invention, as defined by the appended claims and their equivalents.

What is claimed is:

1. A method of managing authentication in an electronic apparatus, the method comprising:
   controlling an authentication module to obtain authentication information;
   pairing, by a hardware processor performing functions, the authentication information with an object to which access is controlled; and
   displaying a first image related to the object with a second image related to the authentication information on a screen of the electronic apparatus, wherein the second image corresponding to the authentication information is displayed on at least one area of the first image related to the object for indicating that the object corresponding to the first image is accessed by the authentication information corresponding to the second image.

2. The method of claim 1, wherein obtaining the authentication information comprises obtaining at least one of letters, numbers, signs, patterns, or biometric data.

3. The method of claim 1, further comprising:
   displaying the object and a valid period according to a type of authentication; and
   changing, as a touch input on the valid period moves in a predetermined direction, the valid period.

4. The method of claim 3, wherein changing the valid period comprises, if the touch input on the valid period moves in a first direction, extending the valid period.

5. The method of claim 3, wherein changing the valid period comprises, if the touch input on the valid period moves in a second direction, reducing the valid period.

6. The method of claim 5, wherein reducing the valid period comprises:
   deleting the authentication information related to the valid period; and
   terminating the object related to the deleted authentication information.

7. The method of claim 5, wherein reducing the valid period comprises:
   deleting the authentication information related to the valid period; and
   unlocking other objects related to the deleted authentication information, or replacing the authentication information of the object with another piece of authentication information.

8. The method of claim 1, wherein access to the object is controlled according to a validity of the authentication information.

9. The method of claim 1, wherein pairing the authentication information with the object to which access is controlled comprises:
   analyzing properties of the object paired with the authentication information;
   retrieving other objects related to the properties;
   making a group that includes the object paired with the authentication information and the retrieved other objects; and
   pairing the authentication information with the objects in the group.

10. The method of claim 9, further comprising:
    giving priority to the group on the basis of the properties of the objects in the group; and
    differentially pairing the authentication information with the objects in the group again according to the priority.

11. The method of claim 1, wherein pairing the authentication information with the object to which access is controlled comprises:
    executing the object that matches the authentication information;
    counting an execution time of the object; and
    if the counted execution time is within a valid period, requesting re-authentication.

12. The method of claim 10, wherein requesting re-authentication comprises performing the re-authentication using an authentication module related to the authentication information, or performing the re-authentication via a predetermined authentication module.

13. The method of claim 10, wherein requesting re-authentication comprises, if authentication fails, terminating the object in progress, or providing transformed information on the object.

14. The method of claim 1, wherein displaying the first image related to the object together with the second image related to the authentication information comprises displaying the image related to the object together with the authentication information in an order of authentication or according to a type of authentication.

15. An electronic apparatus, comprising:
    a hardware processor configured to perform functions of controlling an authentication module to obtain authentication information and pair the authentication information with an object to which access is controlled;
    a display device configured to display a first image related to the object with a second image related to the authentication information, wherein the second image corresponding to the authentication information is displayed on at least one area of the first image related to the object for indicating that the object corresponding to the first image is accessed by the authentication information corresponding to the second image.

16. The electronic apparatus of claim 15, wherein the hardware processor is further configured to obtain, as the authentication information, at least one of letters, numbers, signs, patterns, or biometric data.

17. The electronic apparatus of claim 15, wherein the display device is further configured to display the object or a valid period according to a type of authentication, and the control module is further configured to, as a touch input on the valid period moves in a predetermined direction, change the valid period.

18. The electronic apparatus of claim 17, wherein the hardware processor is further configured to, if the touch input on the valid period moves in a first direction, extend the valid period, and, if the touch input on the valid period moves in a second direction, reduce the valid period.

19. The electronic apparatus of claim 18, wherein the hardware processor is further configured to, if the authentication information related to the valid period is deleted, perform at least one operation of (1) terminating the object related to the deleted authentication information, (2) unlocking other objects related to the deleted authentication information, or (3) replacing the authentication information of the object with another piece of authentication information.

20. The electronic apparatus of claim 15, wherein the hardware processor is further configured to analyze properties of the object paired with the authentication information, retrieve other objects related to the properties, make a group that includes the object paired with the authentication information and the retrieved other objects, and pair the authentication information with the objects in the group.

21. The electronic apparatus of claim 20, wherein the hardware processor is further configured to give priority to the group on the basis of the properties of the objects in the group, and differentially pair the authentication information with the objects again according to the priority.

22. The electronic apparatus of claim 15, wherein the hardware processor is further configured to execute the object that matches the authentication information, count an execution time of the object, and if the counted execution time is within a valid period, request re-authentication.

23. The electronic apparatus of claim 22, wherein the hardware processor is further configured to perform re-authentication using an authentication module related to the authentication information, or perform re-authentication using a predetermined authentication module.

* * * * *